United States Patent
Bettwieser et al.

(10) Patent No.: US 7,200,475 B2
(45) Date of Patent: Apr. 3, 2007

(54) METHODS AND DEVICES FOR IDENTIFYING THE TYPE OF OCCUPANCY OF A SUPPORTING SURFACE

(75) Inventors: Erich Bettwieser, Goettingen (DE); Guenther Maaz, Uslar (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 11/066,479

(22) Filed: Feb. 28, 2005

(65) Prior Publication Data

US 2005/0197754 A1    Sep. 8, 2005

Related U.S. Application Data

(63) Continuation of application No. PCT/EP03/07374, filed on Jul. 9, 2003.

(30) Foreign Application Priority Data

Aug. 29, 2002  (DE)  ................ 102 39 761

(51) Int. Cl.
*B60R 21/01* (2006.01)
*B60K 28/00* (2006.01)
(52) U.S. Cl. ............... 701/45; 180/271; 280/735
(58) Field of Classification Search ............ 701/45, 701/46; 180/271, 273, 268, 282; 280/735, 280/730.01, 730.02; 340/436, 438
See application file for complete search history.

(56) References Cited

U.S. PATENT DOCUMENTS

| | | | |
|---|---|---|---|
| 5,413,378 A * | 5/1995 | Steffens et al. ............ 280/735 |
| 5,482,314 A * | 1/1996 | Corrado et al. ............ 280/735 |
| 5,732,375 A * | 3/1998 | Cashler ..................... 701/45 |
| 5,865,463 A * | 2/1999 | Gagnon et al. ............ 280/735 |
| 5,971,432 A * | 10/1999 | Gagnon et al. ............ 280/735 |
| 6,078,854 A * | 6/2000 | Breed et al. ................. 701/49 |
| 6,259,167 B1 * | 7/2001 | Norton ..................... 307/10.1 |
| 6,397,136 B1 * | 5/2002 | Breed et al. ................ 701/45 |
| 6,774,319 B2 * | 8/2004 | Aoki et al. ................. 177/144 |

FOREIGN PATENT DOCUMENTS

| | | |
|---|---|---|
| WO | WO 95/24616 A1 | 9/1995 |
| WO | WO 01/12473 A1 | 2/2001 |
| WO | WO 01/18507 A1 | 3/2001 |
| WO | WO 02/30717 A1 | 4/2002 |

\* cited by examiner

*Primary Examiner*—Dalena Tran
(74) *Attorney, Agent, or Firm*—Sughrue Mion, PLLC

(57) ABSTRACT

A method and device for identifying the type of occupancy of a supporting surface, particularly of a motor vehicle seat (2), with the aid of force sensor-assisted signals. The sensor signals $s_i$, which are recorded at predetermined instants $t_i$, or quantities derived therefrom, are continuously stored in a memory (4) in such a manner that, the sensor signals from the recent past, or the quantities derived therefrom are available for analysis at any time, and that the type of occupancy is derived from these stored values using at least two independent calculation methods or using a neural network.

36 Claims, 2 Drawing Sheets

METHODS AND DEVICES FOR IDENTIFYING THE TYPE OF OCCUPANCY OF A SUPPORTING SURFACE

This is a Continuation of International Application PCT/EP2003/07374, with an international filing date of Jul. 9, 2003, which was published under PCT Article 21(2) in German, and the disclosure of which is incorporated into this application by reference.

FIELD AND BACKGROUND OF THE INVENTION

The invention relates to a method for identifying the type of occupancy of a supporting surface, such as a motor vehicle seat, using force sensor-assisted signals.

The invention further relates to a device for identifying the type of occupancy of a supporting surface, particularly a motor vehicle seat. In this particular device, at least three force sensors or at least one axis of rotation in conjunction with at least one force sensor are arranged on the supporting surface. The sensors are used to measure the forces acting on the supporting surface by means of measurement electronics connected to the sensors. A control unit connected to the measurement electronics enables the control of a device as a function of the measured values.

The specific detection and distinction between loads on supporting surfaces, e.g., seats, beds or loading areas, is a development goal of modern weighing technology, which has meanwhile become increasingly important beyond this field, e.g., in automotive engineering.

In motor vehicles, for reasons of safety and to prevent injuries, an airbag, in the event of a collision, should not be activated, or should be less forcefully activated or inflated if the corresponding vehicle seat is occupied by a child in a child seat.

It is known to arrange force sensors in the seat, which measure the weight and infer the type of occupancy from the total weight measured. The measurement result can be used by an airbag control unit.

The problem with this arrangement is that the usual securing of the child seat by means of the safety belt can mislead the control unit. When the child seat is secured by the safety belt, the belt generates increased forces as a result of tightening which signal greater weight forces to the built-in sensors than would correspond to the actual weight of the child and the child seat. As a result, the airbag control can incorrectly infer that a light adult instead of a child is occupying the seat. In the event of a collision, the airbag would then be deployed normally although a child seat and a child occupy the seat. Belt forces of up to 100 kg are possible when a child seat is secured, so that a distinction between an adult and a child seat, which is based only on the measured mass occupying the seat, becomes completely impossible. Particularly when the tightening of the belt is combined with an electric height adjustment of the vehicle seat after the child seat has been secured, high belt forces of up to 100 kg are not unusual. There are also child seat models on the market, which due to their own substantial weight combined with that of a child can easily fall within the weight range of what is known in automotive engineering as the "5% woman," even if the belt is not, or is only slightly, tightened, so that a distinction based on the mass occupying the seat can no longer be made.

An improved method for determining the actual weight occupying a motor vehicles seat is disclosed in WO 01/18507 A1 (Method and apparatus for measuring seat occupant weight). Here, the center of gravity or the distribution of mass on the seat is used in addition to the total weight. For this purpose, four force sensors are integrated in the seat, one sensor in each corner area of the seat. The method is based on the fact that an increased tightening of the seat belt when the child seat is secured, in contrast to the occupancy and securing of the belt by an adult, results in an asymmetry of the weight distribution in the area of the sensor adjacent to the belt mounting. An increased force vector is directed at the belt mounting. If a measured asymmetry relative to the total weight exceeds a predefined limit, a compensation factor is calculated and used to downwardly adjust the measured total weight. This is to prevent maloperation of an airbag system. In a preferred embodiment, fixed limits (minimum weight/maximum weight) apply to the correction factor. Outside these limits the correction factor is not used, and within them a linear dependence is used.

A disadvantage of the known method is that weight distributions occur in certain child seat models, which do not produce the asymmetry or produce less asymmetry than required for the functioning of the method, so that a misinterpretation of the seat occupancy cannot be excluded. Although shifts in the center of gravity when child seats are secured can occur, they depend to a large degree on the design of the corresponding child seat and the handling by the corresponding operator. Moreover, it cannot be excluded that an adult, by assuming a sitting position with unilateral loading of the seat, causes an asymmetric weight distribution. Thus the prior-art method cannot satisfy the particularly high reliability requirements of systems for safety-related vehicle equipment.

WO 01/12473 A1 discloses a vehicle occupant position detector and an airbag control system. Here, in addition to the total weight of the seat occupant and a shift in the center of gravity outside a certain range, the inclination angle of the seat back is taken into account. The purpose is to activate an airbag or deactivate or activate it with less force as a function of the occupant weight and the sitting position. The inclination angle of the seat back is determined indirectly by a mass ratio of a front seat area to a rear seat area measured by two force sensors each and by comparing the measured values with predefined stored comparison values. For an erect sitting position or a sitting position in the front area of the seat, a higher value of the weight ratio is expected than for a reclining sitting position of an occupant. If a rather erect or forwardly shifted sitting position is deduced, the airbag is activated with less force or is deactivated. In addition, a distinction is drawn between occupancy by an adult and occupancy by a child on the basis of the total occupant weight measured. If the measured value falls below a certain minimum, the airbag is deactivated or deployed with less force.

The drawback, as explained above, is that high weight forces can occur even if the occupant is a child in a child seat. This can occur if the child seat is a particularly heavy model or due to the tightening of the belt. As a result, using the total weight as the only criterion to distinguish between a seat occupied by a child seat and a seat occupied by an adult is not practical. A further drawback is that child seats, due to different designs, sizes and weights and due to the tightening of the belt when they are secured, can produce different weight distributions resulting in a center of gravity in a front or a rear seat area, or they can produce a uniform weight distribution. For an adult, the weight ratio according to the known method could be used to determine whether the occupant is in a rather erect or reclining sitting position, but because the identification of the adult is relatively uncertain based only on mass, a child seat with a rearward shift of the center of gravity could be misidentified as a reclining person. This would erroneously lead to activation of the airbag, even though the seat is occupied by a child in a child seat.

In summary, a measurement of the weight and the weight distribution does not readily provide a reliable distinction between a seat occupied by a child in a child seat and a seat occupied by an adult.

OBJECTS OF THE INVENTION

It is an object of the invention to develop a method permitting a reliable identification of the type of occupancy of a supporting surface and, as one particular example, a reliable distinction between a motor vehicle seat being occupied by an adult and one occupied by a child in a child seat.

SUMMARY OF THE INVENTION

According to one formulation of the invention, this and other objects can be attained by continuously storing in a memory the sensor signals $s_i$ detected at predefined instants $t_i$, or quantities derived therefrom, by making the sensor signals $s_i$ from the recent past, or quantities derived therefrom, available for evaluation at any time, and by deducing the type of occupancy from these stored values using at least two independent calculation methods or a neural network.

Force sensors arranged in or under the supporting surface supply sensor signals e.g. in a known manner, which have a direct physical relationship to the weight forces applied to the supporting surface. In the conventional methods for identifying the occupancy of motor vehicle seats, an occupancy mass, i.e., the weight of the occupant, and a center of gravity of the occupancy mass were derived from these signals. The measured weight forces, however, do not necessarily reflect the actual weight of the occupant. As explained above, belt forces can distort these values. The measured occupancy mass is the result of the actual mass $m_0$ resting on the supporting surface and all the additional forces acting on the supporting surface. The center of gravity does not provide sufficient information in itself because certain mass distributions can occur in a variety of ways, as explained above. The conventional methods only consider a current snapshot of the occupancy, while the history is not taken into consideration. In contrast, a method according to the invention takes into account the changes in mass over time based on the size of a number of sensor signals $s_i$ recorded over a specific period of time at predefined intervals, or quantities derived therefrom, which are stored in the memory.

According to a preferred embodiment, the memory is configured as a shift register. A shift register, on the one hand, can be understood in the conventional sense as an electronic window shifting over time, which contains a corresponding set of measured quantities that change over time. When the register shifts, the oldest data are discarded. On the other hand, the shift register can also be configured as an electronic window in a more general sense, in which all the information recorded over time is retained. A shift register is conceivable, in particular, in which the information (INFO) is given a weighting c(t) over time, for example, INFO=INFO(t)*c(t), where $\frac{1}{2} \leq c(t) \leq 1$ for $t>t_0$, $t_0$: start of measurement, and $c(t) \to 0$, for $t \to \infty$. All the information of the past would be used, such that the information could be given a weighting that changes over time through the action of the shift register.

Three independent quantities can be measured. The first measured quantity is the mass $$m = \sum_{r=1}^{R} s_r,$$

where R: number of sensors, i.e., the mass as the sum of the sensor signals over the number of the existing sensors at a given sampling instant. Since the time history is evaluated, the absolute values are not necessarily required. A mass scale normalized to the maximum value can be used. The second and third measured quantities are the center of gravity coordinates $$x = \sum_{r=1}^{R} (a_r * s_r)/m \text{ and } y = \sum_{r=1}^{R} (b_r * s_r)/m,$$

where $a_r$ and $b_r$ are lever arms (distances in x and y direction in a Cartesian coordinate system), which result from the sensor arrangement. If the number of the sensors is R>3 the information is redundant, i.e., only three pieces of information from the, e.g., R=4 sensor signals are used. If $R \leq 3$ all sensor signals are considered.

From the time history of the occupancy of the supporting surface, a wealth of additional information can be obtained to enable a reliable identification. Absolute mass values can⊙moreover be taken into account as additional information, as described in more detail below. In particular, typical structural features result from the time history of the sensor signals and the quantities derived therefrom, which can be used to distinguish adult occupants from children or object loads. For example, large jumps in mass, or the time period required until a relatively constant measuring signal is established can be used. By evaluating the structural features using suitable calculation methods, e.g., statistical methods, in which current measured values are compared with structural features that the evaluation algorithm has already learned and in which the time history of the measured quantities is taken into consideration, it is possible to make reliable determinations regarding the type of occupancy.

For this purpose, the algorithm can evaluate a set of measured data from a classification window, which contains a specific number of data measured over a specific period of time, and uses these data to ultimately identify the type of seat occupancy.

The reliability of the statements can be improved by the number of the calculation methods used and by additional information, e.g., absolute masses or accelerations during travel, which are described in greater detail below.

According to another preferred embodiment of the invention, the occupancy of the vehicle seat by an adult is distinguished from the occupancy by a child in a child seat.

The method is particularly suitable to distinguish a vehicle seat occupancy by an adult from a child in a child seat. Child seats produce occupancy patterns that are different from those of adults. As a result, it is possible, for example, to distinguish occupancy by the so-called 5% woman from occupancy by a child in a child seat of equal weight. A safe and reliable distinction is also made between a child seat secured with high force and an adult of equal weight. Because of the accuracy of the classification, the method is particularly suited to control safety-related vehicle equipment, such as airbags.

According to another preferred embodiment of the invention, the recording of the sensor signals $s_i$ is started based on an external start signal. The external start signal can be supplied by the opening of a vehicle door, and the sensor signals can be continuously recorded at least until the seating process has been completed.

Considering the time history of a so-called seating process is particularly suitable for detecting structural features of the seat occupancy. For this purpose, use is made of the knowledge that seating and securing a seatbelt of an adult is typically much faster than securing a child seat and subsequently seating and fastening the seatbelt of a child. Typically a seating process of an adult takes only a few seconds. The seating process with a child seat can take minutes. During this period, different changes in mass are recorded, which are a result of typical handling, e.g., multiple tightening of the seatbelt, bracing with a knee, seating the child, etc., which then produce characteristic structural features for the child seat. These features are then interpreted by means of the calculation method(s) used. From the time when the seating process is complete, it takes approximately 3 seconds before a statement about the occupancy can be made. Opening a vehicle door can be used as a start signal to start the measurements. However, other start signals can be used in principle, either alone or in combination.

According to a further preferred embodiment of the invention, the type of occupancy is continuously monitored by continuously recording and evaluating the sensor signals $s_i$ or the quantities derived therefrom.

Continuous monitoring also makes it possible to detect changes that occur during the use of the supporting surface. Continuous monitoring should be understood to mean that the identification is repeated at predefined intervals, or the system automatically responds to changes in the occupancy and initiates a re-identification. This makes it possible, in particular, to detect any seat changes in a motor vehicle during operation—which in principle can occur in a motor home, for example—and to generate corresponding control signals, e.g., for an airbag system.

The calculation method or methods provide occupancy probabilities $W_k(t_i)$ from n (for example, according to one preferred embodiment, n=64) measurements at the instants $t_i$ (e.g., i=1 . . . n) for different types of occupancy of the supporting surface or the vehicle seat. These occupancy types can be classified as follows:
CONSTANT,
UNOCCUPIED,
PERSON,
CHILD SEAT.

"CONSTANT" means that the evaluation process arrives at a "stable" result, and no further reclassification is performed. The result can be "UNOCCUPIED," i.e., the seat is not occupied. The history, i.e., a previous occupancy, is then deleted, i.e., an initial state for a new identification process is set. If the result is "PERSON" or "CHILD SEAT" a corresponding class is determined and a corresponding control signal is generated. For an airbag, the signals are preferably "AIRBAG ON" or "AIRBAG OFF". The calculation methods are deterministic in nature, but the results are output as probabilities. Prior to defining the class, the classification can be verified using a confidence algorithm. For this purpose, the individual methods used are weighted with a confidence factor $c_j$ and in the aggregate give a total probability $W_k(t_i)$ at a given sampling instant $t_i$. In one embodiment, for a classification to be made, a probability $W_k(t_i)$ for the class k=p for "PERSON" or k=cs for "CHILD SEAT" must exceed a minimum value. Preferably, this minimum value is $W_{lim}$=0.9, i.e., a probability of 90%. For further verification, the history of the classification must still be considered before the class is determined. A classification window in which the probabilities $W_k(t_i)$ over n instants $t_i$ are stored can be evaluated for this purpose. The criterion that can be used is the size of the range of values in which the classification does not change. This gives a confidence coefficient $C_k$. The class is not finally established unless the confidence coefficient $C_k$ exceeds a minimum value, preferably $C_{lim}$=0.75 (75%). With this procedure, a very high degree of certainty of the evaluation result can be obtained. In particular, a distinction between a seat occupied by an adult and a seat occupied by a child in a child seat is made with very high reliability, which satisfies the safety requirements in automotive engineering.

The confidence algorithm can take into account additional boundary conditions to further improve the reliability of the identification, e.g., a rating of "NON-CLASSIFIABLE" because of a poor signal-to-noise ratio, or absolute mass values to check a defined minimum weight $m_{p\ min}$ for an adult, or eliminating belt forces in the weight measurement by taking into account acceleration forces acting on the seat during operation, or forces caused by objects stowed under the seat and pushing upwardly.

The method can in principle be used for all child seat models offered on the market and, in contrast to conventional methods, is not subject to interference due to high belt forces, special sitting positions or unusual mass distributions. Moreover, a belt force sensor is not required.

According to additional preferred embodiments, an airbag system associated with a vehicle seat is deactivated by the control signal if the occupancy class k=cs is determined, and is activated if the occupancy class k=p is determined. It is also possible to activate an airbag system associated with the vehicle seat by the control signal in such a way that when triggered, the airbag is inflated with less force if the occupancy class determined is k=cs and with full force if the occupancy class determined is k=p.

Occupancy identification can be used advantageously for a situation-dependent control of an airbag system. Deactivating or reducing the inflation force of the airbag if a child is sitting in the vehicle seat avoids injury to the child by an airbag inflated with full force. Reducing the inflation force of the airbag also optimally uses the protective function of the airbag for a child, without the airbag itself being a potential source of injury. Furthermore, all airbags of unoccupied seats can be switched off. This has the advantage of potentially reducing repair costs after a collision. The airbag can also be switched off if an object is placed on the corresponding seat.

According to still another embodiment of the invention, by calculating an absolute occupancy mass occupying the seat, additional information can be obtained, which further improves the reliability of the method. Preferably, the limit value $m_{p\ min}$ is assumed as the minimum weight for an adult (e.g., $m_{p\ min}$=32.5 kg), which must be measured as the minimum load when an adult occupies the seat. In other words, if the measured value is less than $m_{p\ min}$ the class p is excluded. An airbag could then be deactivated for safety reasons, irrespective of the actual occupancy. Based on what has been said so far, the converse is of course not possible. Comparable information can be obtained by determining the center of gravity.

According to yet another preferred embodiment of the invention, acceleration forces caused by driving effects acting on the vehicle during operation of the vehicle and recorded via the sensor signals $s_i$ are not taken into account in the classification.

This method can be used to detect the true mass $m_0$ on the seat. True mass means the load excluding the seat belt force. The method works only after a few minutes of driving, in contrast to the above-described structural feature detection, which in the ideal case permits an identification already within 3 seconds after completion of the seating process. It is therefore considered an additional "insurance," which lends additional evidence to the previously made decision. As a result, the reliability of the method is further improved. Using typical values, the following examination illustrates how the method works.

A first effect is produced by additional vertical accelerations. The apparent mass m and the center of gravity coordinates (x, y) are measured as a function of time during driving, and statistical parameters (standard deviations) are derived therefrom. Assume that an additional vertical acceleration influences the mass $m_0$ due to chassis instabilities. A person of $m_0$=90 kg and a child seat of $m_0$=30 kg and an additional seat belt force of 60 kg is being considered, i.e., m=$m_0$+60 kg=90 kg. Thus, while the load indication m is 90 kg for each, the typical response to chassis instabilities with vertical acceleration changes of, e.g., ±0.1 g or δm=±9 kg for the person and δm=±3 kg for the child seat, i.e., 3 times smaller than the indicated load m. This effect is called the δm reduction.

A second effect is caused by a constriction of the horizontal movement of the center of gravity as a result of a seat belt force. Depending on the seat belt force, this effect can reduce the mobility of the center of gravity by a factor of up to 10. This feature, which is very conspicuous in the time history, is independent of the unrestrained (non-secured) mass $m_0$ or the load indication m (since the center of gravity is defined as the torque per mass). The effect is referred to as the δ(x,y) reduction.

According to a further preferred embodiment of the invention, changes in the measured quantities occurring as a result of long term effects, δm, δx, δy are taken into account in the classification.

A long-term effect is, for example, a so-called settling of the seat belt force. This manifests itself in that immediately after the seat belt has been fastened to secure a child seat, the center of gravity and the mass readout settle at a level that is nearly constant over the long term. The seat belt force can settle in both the moving and the stationary vehicle. During driving, the settling of the seatbelt force can be accelerated by the chassis instabilities.

According to another preferred embodiment of the invention relating to particular calculation methods, the occupancy detection of a vehicle seat is based on detecting a seat occupancy pattern characteristic for the type of seat occupancy by evaluating the memory contents with the aid of a neural network.

Neural networks are effective tools for detecting patterns of statistical measured data. Their functioning is known, e.g., from WO 95/24616. The measured quantities m, x, y form the contents of the memory or shift register. If all existing patterns are implemented, a neural network is sufficient when used as the only calculation method to reliably identify the seat occupancy. The neural network is an indeterministic method with the goal to achieve a correspondence of m(t) with fixed, predefined patterns. Probabilities for p and cs are determined as the output values.

According to yet another embodiment of the invention, at least two independent calculation methods are provided. A first calculation method is based on, for example, detecting the structural features of the seat occupancy by evaluating the memory or shift register contents using a regression analysis. A second calculation method is based on, for example, detecting the structural features by evaluating the memory or shift register contents using an occupancy entropy analysis.

The regression analysis in combination with the occupancy entropy analysis offers a particularly reliable identification of the seat occupancy. Moreover the memory requirement is relatively low. The special steps defined in the dependent claims 25 and 26 are provided. The regression analysis is a deterministic method (c.f., method of the smallest error square). Correlation coefficients and quantitative values (height of the step, slope, . . . ) are determined as the output. The values are supplied to a so-called member function, i.e., are (generally non-linearly) mapped to 0 (improbable) to 1 (highly probable). Occupancy entropy is a statistical method without a specific pattern. An entropy value S is determined as the output. A low entropy indicates constant occupancy or occupancy by a person, while a high entropy indicates a child seat.

According to other preferred embodiments of the invention, a structural feature detection of the seat occupancy by means of a fast Fourier transform analysis of the memory contents is provided as an additional calculation method. A structural feature detection using an autocorrelation analysis of the memory contents may also be provided as an additional calculation method.

In the fast Fourier transform analysis, the fast Fourier transform fft is calculated at multiple instants $t_i$. A check determines whether the total structure remains self-similar if there is a time shift. If yes, the Fourier transforms are interlinked at different instants in a simple manner. The expected self-similarity applies to the structures PERSON and CONSTANT, but not to the structure CHILD SEAT. An autocorrelation analysis leads to a comparable result. When used as additional methods, particularly to supplement the regression analysis, these two methods can further increase the reliability regarding the classification.

Whereas the neural network method works as a sole method if all essential patterns are implemented, the other methods work in combination, particularly regression analysis combined with occupancy entropy. These methods only require structural features, i.e., no fixed morphology like the neural network. As a result, they can be used even more generally. Because they are controlled by many parameters, they are highly flexible when adapted to different problem fields. Particularly advantageously, these two methods can also be combined with the fast Fourier transform. Finally, if all the methods discussed are combined, the information obtained is partly redundant. This improves the accuracy even further.

To provide an overview, some non-limiting examples of the structural features for a person and a child seat are summarized below:

Structural features for a person are: a large step in m, a high slope dm/dt of the step, good correlation between a measured step and a theta function (jump function), number of steps=1, no downward step, no significant additional structure with the exception of noise, low occupancy entropy (S=0), a translationally variant pattern over time, pattern p is detected by the neural network. Other structural features for a person are: high noise in x(t) and y(t) due to movement of the person; m(t) remains at a high level even over a relatively long time.

Structural features for a child seat are: occupancy entropy is large (S=2), pattern cs is detected by the neural network. Other structural features incoude: clear trend in x(t) or y(t) in one direction (sideways or downwards), x(t) and y(t) ultimately change little (little noise), essential structures in m(t) (several steps), high short-term excursions in m(t) or x(t), y(t) (peaks).

The known devices for determining an occupancy mass of a supporting surface have the drawback that their design is not adequate for consistently identifying the type of occupancy.

It is therefore a further object of the present invention to refine the known devices in such a way that they can be used to carry out a method for identifying the type of occupancy of the supporting surface, which satisfies the requirements of reliability and information diversity.

This object can be attained according to the invention by connecting the measurement electronics with a memory in which the sensor signals $s_i$ recorded at predefined instants $t_i$, or quantities derived therefrom can be continuously stored such that the sensor signals $s_i$ from the recent past, or the quantities derived therefrom are available for analysis at any time. A data processing unit is provided, which determines the type of occupancy from the values stored in the memory using at least two independent calculation methods or a neural network.

The sensor signals $s_i$, or the measured quantities m, x, y can be continuously stored in the memory over time, such that the time history of the occupancy of the supporting surface can be recorded. The data processing unit supplies the algorithm with measured data. The algorithm is the basis of a method used to identify the type of occupancy of the supporting surface from the time history of the data and, furthermore, to extract a wealth of information for one-time or continuous monitoring. This provides significantly expanded options to control devices in connection with the type of occupancy of the supporting surface.

According to a preferred embodiment of the invention, the controlled device is an airbag system.

The device is used particularly advantageously to control airbag systems in automotive technology. This makes it possible to switch the airbags on or off deliberately or to inflate them with less force. As a result, the airbag can be adapted individually to the actual occupancy of a seat, particularly to protect children against potential injury by the airbag.

According to a further preferred embodiment of the invention, a result memory independent of the vehicle's power supply is provided to store the data evaluated by the data processing unit. The result memory is cleared at least when the memory or the shift register is cleared completely (e.g., if a seat is unoccupied).

With the result memory, the history of the seat occupancy can be stored and secured independently of the vehicle's power supply. This ensures that even if the power supply is interrupted, e.g., due to a defect or if the battery is disconnected, the operation of the airbag control by the control signals as a function the type of seat occupancy is ensured and maintained. This further improves the degree of functional safety and reliability of the airbag system.

The methods and devices are not limited to the identification of the occupancy of motor vehicle seats. In principle, the methods according to the invention are suitable for all types of supporting surfaces where an occupancy mass can be measured by means of force sensors. In particular, the methods according to the invention are also suitable for hospital beds and wheelchairs, e.g., to detect specific clinical pictures connected with patient movements, e.g., restless leg syndrome, in sleep research or to detect a patient's weight shifts. Although the methods according to the invention are directed in particular at identifying the occupancy of a motor vehicle seat, they can be adapted to the requirements of special hospital beds or wheelchairs with a comparable procedure. Particularly the methods of regression analysis and occupancy entropy analysis are suitable for a corresponding adaptation by reading in the system parameters.

BRIEF DESCRIPTION OF THE DRAWINGS

Further details of the invention will now be described, by way of a non-limiting example, with reference to preferred embodiments of the invention depicted in the attached drawings in which.

DETAILED DESCRIPTION OF PREFERRED EMBODIMENTS

Figure 1:
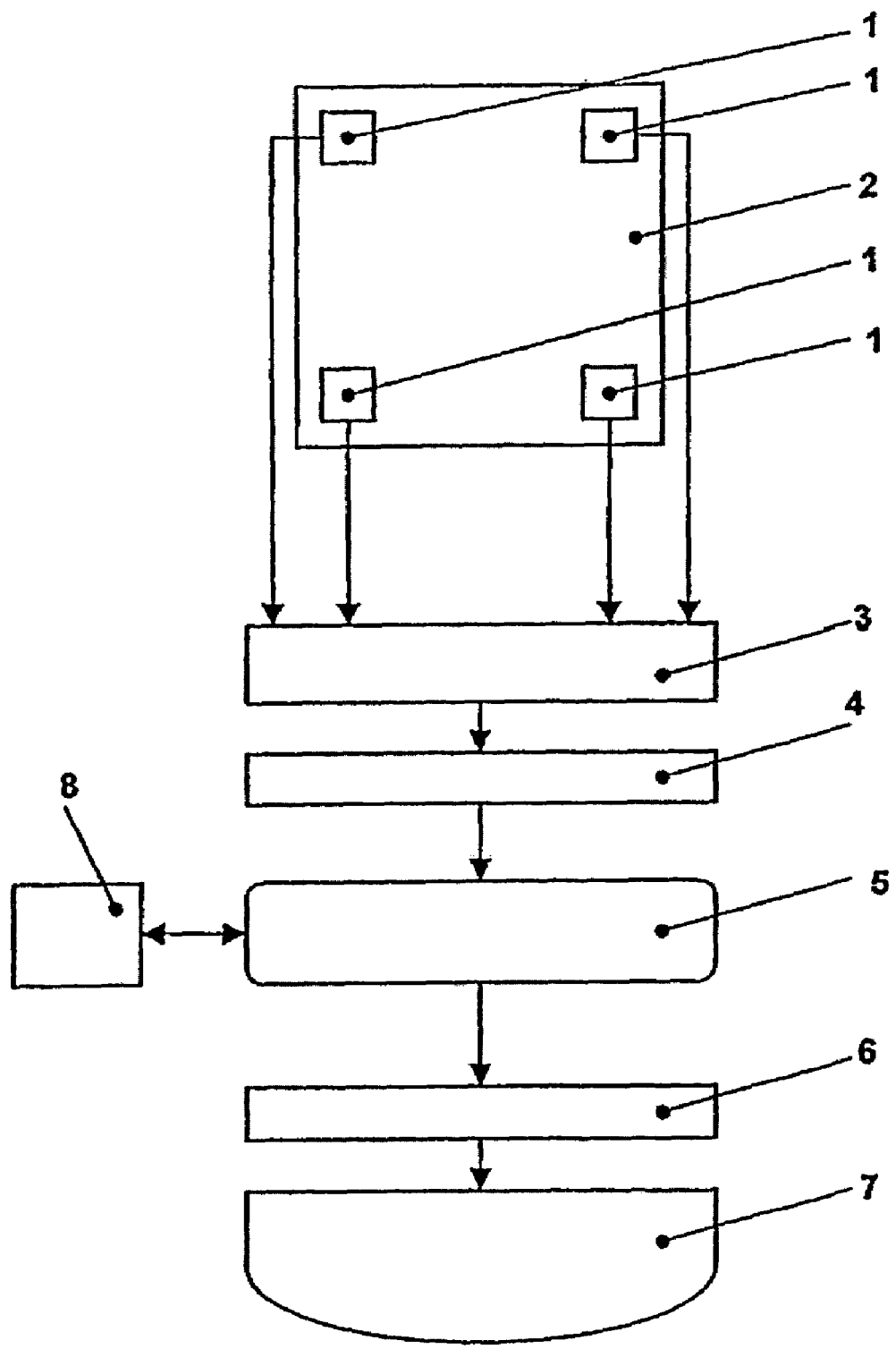
FIG. 1 shows a block diagram for identifying the type of occupancy of a motor vehicle seat.

A device for identifying the type of occupancy of a motor vehicle seat 2 has four force sensors 1, which are connected to measurement electronics 3 and a memory 4. A data processing unit 5 is connected downstream of the measurement electronics 3 and is used to control an airbag system 7 via a control unit 6.

In or under the vehicle seat 2, four force sensors 1 are arranged in the corner areas of the seat in a known manner. They are used to measure the weight force or mass acting on the seat by means of the measurement electronics 3. In principle, the sensors are at least three force sensors 1, although an axis of rotation in conjunction with at least one force sensor or even sensor foils may be considered. The sensors are used to measure an occupancy mass and a load distribution across the seat. The measurement electronics 3 are configured in such a way that they continuously store in the memory 4 the sensor signals $s_i$ recorded at predefined instants $t_i$ from the recent past, or quantities derived therefrom, at predefinable sampling rates. The sensor signals $s_i$ are accepted by the data processing unit 5 and are processed by means of at least two independent calculation methods or a neural network. A control signal is provided as the result, which can be evaluated by the control unit 6 to activate or deactivate the standby mode of the airbag system 7, or to activate it with less functional force. A result memory 8 independent of the vehicle power supply for storing the data evaluated by the data processing unit 5 communicates with the data processing unit 5.

A method for identifying the type of occupancy of a motor vehicle seat 2 essentially derives the type of occupancy from the quantity and time history of the sensor signals recorded at predefined instants $t_i$ and stored in the memory 4, e.g., a time window functioning as a shift register.

The identification of the type of seat occupancy by means of a neural network will now be described as one possible embodiment.

Figure 2A:
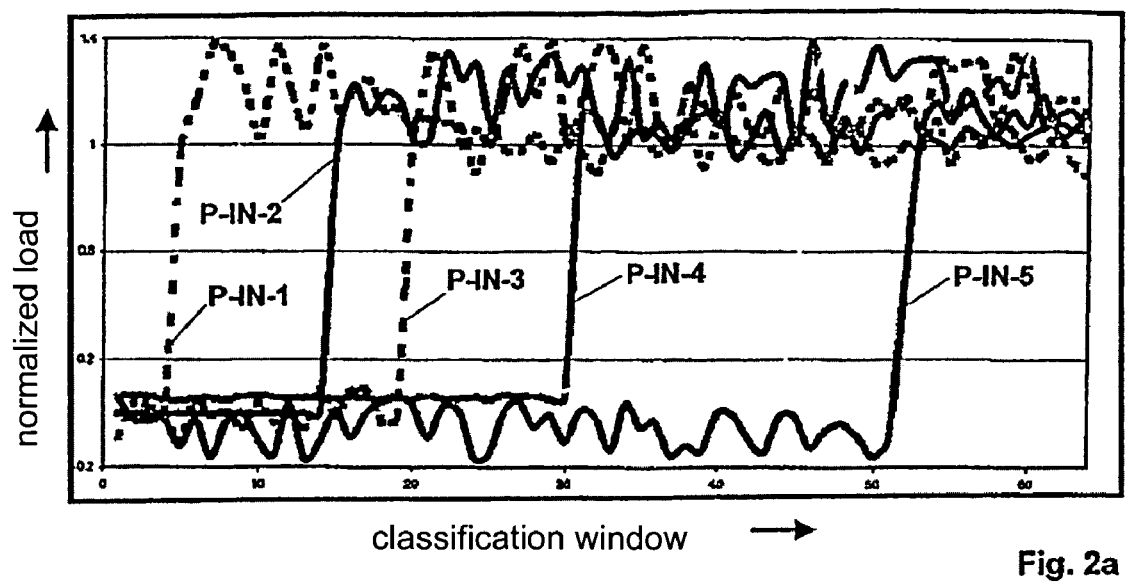
FIGS. 2a and 2b show diagrams of the time history of the occupancy of the motor vehicle seat for different occupancy types.
Figure 2B:
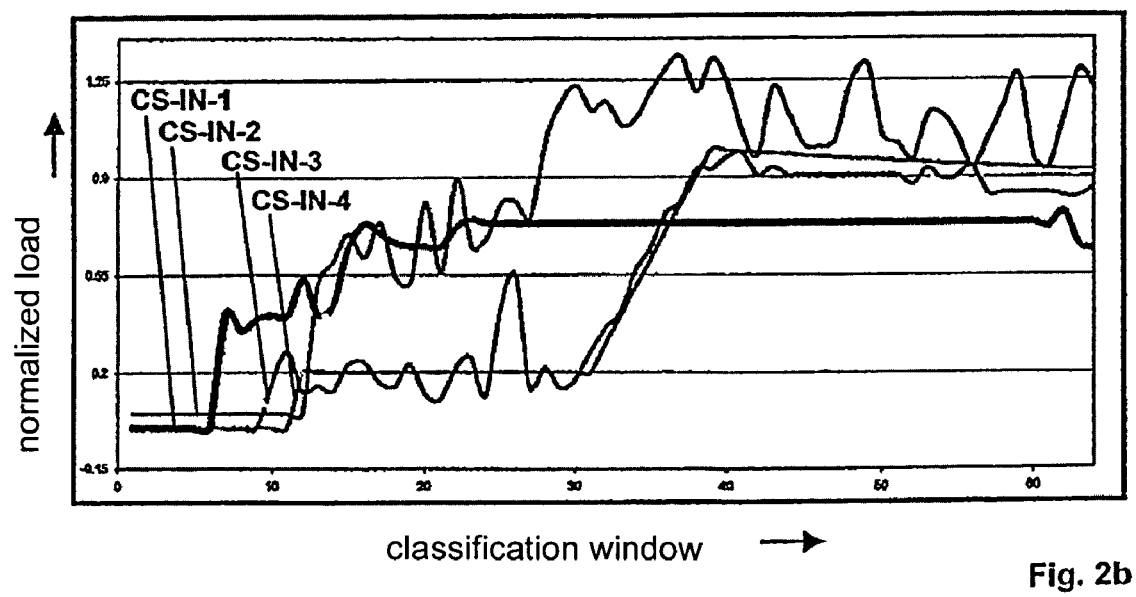

This method is based on the detection of a seat occupancy pattern. The time history, e.g., that of a seating pattern of the measured quantity m(t) and/or the center of gravity vector (x, y)(t) is examined. The seating pattern in this case means the time-dependent measured quantity m(t) or the Fourier transform of such a characteristic. The measured quantities m(t) do not have to be known as absolute masses. Instead, a normalized load from 0 to 1 is used. Adults and child seats produce typical seating patterns, which are shown in the diagrams of FIG. 2a and FIG. 2b. The data m(t) of the last 64 seconds (after the start of measurement) are used as the classification window, i.e., 64 sampling instants at a typical sampling rate of 1 sec. These sampling instants form the classification window (x-axis) in the diagrams. Plotted against this are normalized loads (y-axis). The curves shown in the diagrams are the result of computational simulations, which use the measurement data from test series with a wide variety of child seats and different adults. Thus, the curves represent very realistic patterns of seat occupancy in actual practice. The neural network was tested using these occupancy patterns and correlation coefficients were calculated therefrom. The information obtained as a result is, for example, 90% correlation with a person and 87% correlation with a child seat, despite disturbances caused by signal noise (running of the vehicle engine, chassis instability, etc.).

The diagram of FIG. 2a shows a typical seating pattern for the occupancy of a seat for five different persons P-IN-1, P-IN-2, P-IN-3, P-IN-4, P-IN-5. The corresponding person opens the vehicle door, sits down and fastens the safety belt. The classification is complete three seconds after the end of the seating process. The data that is missing in the classification window is completed by adding the first detected value at the back, so that the window is always filled With 64 values. The classification window changes in terms of the shift register, such that the corresponding classification is the one shown below in Table 1 by way of a basic example (the values added at the back are shown in italics):

noisy signals. Use is made of the fact that a neural network, when correspondingly configured, filters automatically, i.e., "CONSTANT-PERSON" is the detection of a constant load on average, even with an introduced noise level.

Clearly evident in the diagram of FIG. 2a is that in all seating curves there is a "sharply" defined step with a large weight jump and an increase of up to 100 kg/sec. This step is entered in the neural network as a detection feature for a person.

FIG. 2b shows a characteristic diagram for the seating process for four different child seats (without child), CS-IN-1, CS-IN-2, CS-IN-3, CS-IN-4. The following Table 2 shows two typical classification characteristics by way of example:

TABLE 2

| Characteristic CS-IN-1 | Characteristic CS-IN-2 |
|---|---|
| k(0) . . . k(6) = CONSTANT-UNOCCUPIED | k(0) . . . k(12) = CONSTANT-UNOCCUPIED |
| k(7) = NON-CLASSIFIABLE | k(13) = NON-CLASSIFIABLE |
| k(8) = CHILD SEAT | k(14) . . . k(16) = PERSON |
| k(9) = CHILD SEAT | k(17) . . . k(29) = CHILD SEAT |
| k(11) = CHILD SEAT | k(30) = PERSON |
| k(12) . . . k(25) = CHILD SEAT | k(31) . . . k(62) = CHILD SEAT |
| k(26) . . . k(63) = CONSTANT-OCCUPIED | k(63) = CHILD SEAT |
| k(64) = CONSTANT-OCCUPIED | k(64) = CONSTANT-OCCUPIED |
| k(65) = CONSTANT-OCCUPIED | k(65) = CONSTANT-OCCUPIED |
| Confidence level: 93% | Confidence level: 62% |

The diagram of FIG. 2b compared to the diagram of FIG. 2a shows more differentiated curves. Notable, in particular, is that the course of the seating process with a child seat at times includes the person pattern. This is therefore expressly allowed when the parameters for the neural network are

TABLE 1

| $t_i$ where i = | m [kg] | Shift Register (measured values are not in italics) | Class $k(t_i)$ | Confidence Person Class [%] |
|---|---|---|---|---|
| 0 | 0 | (*0, 0, . . . , 0, 0*) | k(0) = CONSTANT-UNOCCUPIED | 0 |
| 1 | 78 | (*0, . . . 0, 0*, 0, 78) | k(1) = PERSON | 1.5 |
| 2 | 69 | (*0, . . . 0, 0*, 0, 78, 69) | k(2) = PERSON | 3 |
| 3 | 74 | (*0, . . . 0, 0*, 0, 78, 69, 74) | k(3) = PERSON | 4.7 |
| J | 63 | (*0, . . . , 0*, 0, 78, 69, 74, . . . , 63) | k(j) = PERSON | 1.58 * j |
| 62 | 68 | (*0, 0*, 78, 69, 74, . . . , 63, . . . , 68) | k(62) = PERSON | 98 |
| 63 | 73 | (*0*, 78, 69, 74, . . . , 63, . . . , 68, 73) | k(63) = PERSON | 100 |
| 64 | 70 | (78, 69, 74, . . . , 63, . . . , 68, 73, 70) | k(64) = CONSTANT-OCCUPIED | 100 |
| 65 | 65 | (69, 74, . . . , 63, . . . , 68, 73, 70, 65) | k(65) = CONSTANT-OCCUPIED | 100 |

The indicated confidence (last column of the table) is based on the assumption that the classification PERSON occurred at all instants. If another classification resulted at certain times, e.g., CHILD SEAT or NOT CLASSIFIABLE, the confidence level did not reach 100%. In the extreme case of a constant reclassification, the confidence level remained at 0%.

Thus, there is a continuous confirmation of the classification during the time interval $t_i$ (i=1 . . . 64), which fills the classification window. To subsequently obtain the classification "CONSTANT", filtered values {M} are supplied after unfiltered measured values {m} were initially entered in the classification algorithm to suppress a reclassification due to entered. Several successive components are entered in the neural network as detection features for a child seat:

Installing the child seat without the child: the mass changes quickly to a relatively low level and is nearly constant at times thereafter, Tightening of the seat belt in one or more attempts (high load), very noisy signal because of bracing with the knee, nearly linear increase at approximately 10 kg/sec thereafter, Slow exponential decrease of the reached maximum force to an equilibrium lowered by approximately 10% due to so-called belt force settling.

Other diagrams and patterns can be established in the same manner for seating the child in the installed child seat and for removing the child. They play only a complementary, subordinate role in the classification, however.

Overall, based on the features learned by the neural network, the possible distinctions:

CONSTANT,
PERSON,
CHILD SEAT,
NON-CLASSIFIABLE, and/or
REMOVAL, are given as probabilities with which the type of seat occupancy is identified with certainty and reliability.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A method for identifying the type of occupancy of a supporting surface, using sensor signals, comprising:
   storing the sensor signals recorded at predefined instants $t_i$, or quantities derived from the sensor signals, in a memory as stored values, $st_i$,
   making available for evaluation the stored values $st_i$, from a recent past,
   evaluating further sensor signals at a selected predefined instant $t_i$ in conjunction with the stored values $st_i$, and deriving the type of occupancy from the evaluation,
   wherein the recording of the stored values $st_i$ is started via an external start signal.

2. The method as claimed in claim 1, wherein the supporting surface is a motor vehicle seat and the sensor signals are emitted from sensors that sense forces on the motor vehicle seat.

3. The method as claimed in claim 2, wherein said storing of the sensor signals is performed continuously.

4. The method as claimed in claim 3, wherein said deriving of the type of occupancy comprises using at least two independent calculation methods or a neural network.

5. The method as claimed in claim 4, wherein the occupancy of the motor vehicle seat by an adult is distinguished from the occupancy by a child seat and a child.

6. The method as claimed in claim 4, wherein the type of occupancy is continuously monitored by continuously recording and evaluating the stored values $st_i$.

7. The method as claimed in claim 4, wherein the stored values $st_i$ are stored in a shift register.

8. The method as claimed in claim 4, wherein an airbag system associated with the motor vehicle seat is deactivated when the type of occupancy is determined to be a child seat, and wherein the airbag system is activated when the type of occupancy is determined to be a person.

9. The method as claimed in claim 2, wherein the external start signal is supplied by an opening of a door of a motor vehicle containing the motor vehicle seat, and wherein the stored values $st_i$ are continuously recorded at least until the seating process is complete.

10. A method for identifying the type of occupancy of a supporting surface, using sensor signals, comprising:
    storing the sensor signals recorded at predefined instants $t_i$, or quantities derived from the sensor signals, in a memory as stored values, $st_i$,
    making available for evaluation the stored values $st_i$, from a recent past, and
    deriving the type of occupancy from these stored values,
    wherein the supporting surface is a motor vehicle seat and the sensor signals are emitted from sensors that sense forces on the motor vehicle seat,
    wherein said storing of the sensor signals is performed continuously,
    wherein said deriving of the type of occupancy comprises using at least two independent calculation methods or a neural network,
    wherein the stored values $st_i$ are stored in a shift register, and
    wherein at least the following steps are executed:
    (a) reading out the stored values $st_i$ at the instants $t_i$, $i=1 \ldots n$, with a shift register number n from the shift register, forming measured quantities for an occupancy mass $m(t_i)$ and a location of the center of gravity $(x,y)(t_i)$, storing the measured quantities in the shift register, deleting the first value and shifting the shift register by one step,
    (b) classifying the seat occupancy based on a plurality of classification states by means of occupancy probabilities $W_k(t_i)$ determined from the content of the shift register using the at least two calculation methods or the neural network,
    (c) calculating occupancy classes k=p for occupancy by a person and k=cs for occupancy by a child seat, which satisfy an occupancy probability condition $W_k(t_i) > W_{lim}$, with a probability limit value $W_{lim}$, and storing the values in a classification window,
    (d) counting up the classification window of the last n values starting from n toward the past and entering the values in a confidence algorithm,
    (e) executing the confidence algorithm,
    (f) repeating the steps (a) to (e) until a confidence coefficient $Ck > C_{lim}$, where $C_{lim}$: confidence limit, has been determined, or aborting when an abortion condition is satisfied,
    (g) establishing the occupancy class k by means of the calculated confidence coefficient $C_k$ for this class,
    (h) providing a control signal as a function of the established occupancy class k.

11. The method as claimed in claim 10, wherein the classification occurs based on at least the following four classification states:
    (A) CONSTANT,
    (B) UNOCCUPIED,
    (C) PERSON,
    (D) CHILD SEAT.

12. The method as claimed in claim 10, wherein the confidence algorithm is executed by calculating the confidence coefficient according to the equation $C_k = N_k/n$ for the classes k=p and k=cs from the corresponding number $N_k$ of successive occupancy classes p and cs which satisfy the condition $W_k(t_i) > W_{lim}$, taking into consideration the boundary conditions:
    (a) reducing the confidence coefficient according to the equation $C_k = (N_k-1)/n$, if a reclassification occurs at an instant $t_i$ or if a classification "NON-CLASSIFIABLE" occurs,
    (b) deleting a previous allocation of the classification window and setting $C_k=0$ if the classification state "UNOCCUPIED" is determined, and outputting $C_k$ if the classification state "CONSTANT" is determined.

13. The method as claimed in claim 10, wherein the shift register memory number is n=64 or greater.

14. The method as claimed in claim 10, wherein the probability limit $W_{lim}$=0.9 or greater.

15. The method as claimed in claim 10, wherein the confidence limit $C_{lim}$=0.75 or greater.

16. The method as claimed in claim 10, wherein an airbag system associated with the motor vehicle seat is deactivated via the control signal when the occupancy class k=cs is determined, and wherein the airbag system is activated when the occupancy class k=p is determined.

17. The method as claimed in claim 16, wherein the airbag system associated with the motor vehicle seat is deactivated via the control signal such that the airbag system, when triggered, is inflated with less pressure force when the occupancy class k=cs is determined, and the airbag system, when triggered, is inflated with full pressure force when the occupancy class k=p is determined.

18. The method as claimed in claim 10, wherein the occupancy mass $m(t_i)$ measured as the occupancy of the motor vehicle seat is compared with a predefined minimum occupancy mass $m_{p\ min}$, and that the comparison result is taken into account in the classification.

19. The method as claimed in claim 18, wherein the minimum occupancy mass $m_{p\ min}$=32.5 kg.

20. The method as claimed in claim 10, wherein, during operation of the motor vehicle, acceleration forces caused by driving effects and acting on the vehicle seat are recorded via the sensor signals and are taken into account in the classification.

21. The method as claimed in claim 10, wherein influences by objects stowed under the motor vehicle seat and applying forces to the motor vehicle seat and influencing the sensor signals are taken into account in the classification.

22. The method as claimed in claim 10, wherein changes in the measured quantities δm, δx, δy as a result of long-term effects are taken into account in the classification.

23. The method as claimed in claim 10, wherein the occupancy detection of the motor vehicle seat is based on the detection of a seat occupancy pattern characteristic for the type of the seat occupancy by evaluating the memory contents using the neural network.

24. The method as claimed in claim 23, wherein the neural network comprises at least the following steps:
(a) entering mass characteristics over time m(t) using a normalized mass scale [0,1], step functions and typical child seat patterns, and generating a learning record,
(b) supplying the current n values from the memory,
(c) calculating output neurons for probabilities of the occupancy based on at least the following states:
CONSTANT
PERSON
CHILD SEAT
NON-CLASS CLASSIFIABLE and/or
REMOVAL.

25. The method as claimed in claim 10, wherein at least two independent calculation methods are provided.

26. The method as claimed in claim 25, wherein the occupancy probability $W_k(t_i)$ is determined as a total occupancy probability from the employed individual calculation methods based on the equation $$W_k(t_i) = \sum_{j=1}^{u} c_j \cdot W_k^j(t_i),$$

with $c_j$: confidence factor of the method j, and u: number of the calculation methods.

27. The method as claimed in claim 25, wherein the first calculation method is based on a structural feature detection of the seat occupancy by evaluating the memory contents using a regression analysis, and the second calculation method is based on the structural feature detection by evaluating the memory contents using an occupancy entropy analysis.

28. The method as claimed in claim 27, wherein the regression analysis comprises at least the following steps:
(a) determining a correlation coefficient and a step point $t_{step}$, STEP UP or STEP DOWN, from the analysis of the structural features of the seat occupancy by a person over n values,
(b) determining a correlation coefficient, a slope in mass per time and a step in mass by analyzing a STEP UP in proximity of $t_{step}$ over a predefined number of v<n values,
(c) counting up the number $N_{step}$ of the STEPS UP, which are above the predefined minimum mass $m_{p\ min}$ for an adult,
(d) calculating the occupancy probability for a person from the height of the step relative to a norm value Norm1 and the amount of the slope relative to a norm value Norm2 in a member function according to the relation:
$W_p$=⅓*(step/Norm1)+⅓*(slope / Norm2)+⅓*$\delta_{N1}$,
with $\delta_{N1}$=1(for $N_{step}$=1) and $\delta_{N1}$=0(for $N_{step}$≠1), and
(e) checking the structural features for constant occupancy.

29. The method as claimed in claim 27, wherein the occupancy entropy analysis comprises at least the following steps:
(a) normalizing the mass scale to [0,1],
(b) dividing the normalized mass scale into z<n cells,
(c) counting up the number of the values $w_i$ for each cell across the classification window,
(d) calculating the occupancy entropy based on the equation $$S = -\sum_{i=1}^{z} c_i w_i \ln w_i,$$

with $c_i$: weighting, negative in proximity of the scale ends [0,1], higher weighting of the cells between the scale ends, normalizing to a total entropy $S_{total}$,
(e) calculating the probabilities for the seat occupancies according to the relations $W_{cs}$=S/$S_{total}$−1, with k=cs for S/$S_{total}$>1 and $W_p$=1−S/$S_{total}$, with k=p for S/$S_{total}$ <1.

30. The method as claimed in claim 25, wherein an additional calculation is performed using a fast Fourier transform analysis of the memory contents to detect the structural feature of the seat occupancy.

31. The method as claimed in claim 25, wherein an additional calculation is performed using an autocorrelation analysis of the memory contents to detect the structural feature of the seat occupancy.

32. A system for identifying the type of occupancy of a supporting surface, comprising:
- at least three force sensors or at least one axis of rotation in conjunction with at least one force sensor arranged on the supporting surface;
- measurement electronics via which the at least three force sensors or the at least one axis of rotation in conjunction with the at least one force sensor measure forces acting on the supporting surface; and
- a control unit that controls the system as a function of measured values as determined by the measurement electronics;
- a memory in communication with the measurement electronics such that sensor signals recorded at predefined instants $t_i$, or quantities derived from the sensor signals, are continuously stored as stored values $st_i$, with the stored values $st_i$ from the recent past available for evaluation at any time; and
- a data processing unit that determines the type of occupancy by evaluating further sensor signals at a selected predefined instant $t_i$, in conjunction with the stored values $st_i$ using at least two independent calculation methods or using a neural network,
- wherein the recording of the stored values $st_i$ is started via an external start signal.

33. The system as claimed in claim 32, wherein the memory is configured as a shift register.

34. The system as claimed in claim 32, wherein the system controlled is an airbag system for a motor vehicle.

35. The system as claimed in claim 32, wherein a result memory independent of a vehicle power supply is provided for storing data evaluated by the data processing unit.

36. The system as claimed in claim 32, wherein the external start signal is supplied by an opening of a door of a motor vehicle, and wherein the stored values $st_i$ are continuously recorded at least until the occupancy process is complete.

* * * * *